US009639675B2

(12) United States Patent
Baudel et al.

(10) Patent No.: US 9,639,675 B2
(45) Date of Patent: *May 2, 2017

(54) SHARING AND EXECUTING SENSITIVE LOGIC SEMANTICS

(71) Applicant: International Business Machines Corporation, Armonk, NY (US)

(72) Inventors: Thomas Baudel, Paris (FR); Nicolas Changhai Ke, Wissous (FR); Pierre-Andre Paumelle, Soisy sur Seine (FR); Jean-Yves Rigolet, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,310

(22) Filed: Oct. 12, 2015

(65) Prior Publication Data

US 2016/0232000 A1 Aug. 11, 2016

Related U.S. Application Data

(63) Continuation of application No. 14/618,394, filed on Feb. 10, 2015, now Pat. No. 9,454,470.

(51) Int. Cl.
G06F 9/45 (2006.01)
G06F 21/14 (2013.01)
G06F 9/44 (2006.01)
G06F 11/36 (2006.01)

(52) U.S. Cl.
CPC ............... G06F 21/14 (2013.01); G06F 8/70 (2013.01); G06F 11/3688 (2013.01); G06F 2221/0724 (2013.01); G06F 2221/0746 (2013.01); G06F 2221/0748 (2013.01); G06F 2221/2123 (2013.01); G06F 2221/2127 (2013.01)

(58) Field of Classification Search
CPC .................................................. G06F 11/3688
See application file for complete search history.

(56) References Cited

U.S. PATENT DOCUMENTS

| 8,393,003 | B2 | 3/2013 | Eker et al. | |
| 8,522,047 | B2 | 8/2013 | Eker et al. | |
| 8,752,035 | B2 | 6/2014 | Fanning et al. | |
| 2006/0136867 | A1* | 6/2006 | Schneider | G06F 21/14 717/106 |

OTHER PUBLICATIONS

IBM, List of IBM Patents or Patent Applications Treated as Related, Appendix P, dated Aug. 1, 2016, 2 pages.

(Continued)

Primary Examiner — Hang Pan
(74) Attorney, Agent, or Firm — David Zwick

(57) ABSTRACT

Removing high level logic structure from a source program. Two or more source program fields are characterized by their respective value characteristics. A first field is mapped, with respect to the source program, to a second field having similar value characteristics as the first field. A target program is then created by replacing, in the source program, the first field with the second field and replacing each first field value with a corresponding second field value thereby preserving the value characteristics of the source program.

5 Claims, 5 Drawing Sheets

(56) References Cited

OTHER PUBLICATIONS

Pending U.S. Appl. No. 14/618,394, filed Feb. 10, 2015, Entitled: "Sharing and Executing Sensitive Logic Semantics".
Pending U.S. Appl. No. 15/214,539, filed Jul. 20, 2016, Entitled: "Sharing and Executing Sensitive Logic Semantics".
IBM: List of IBM Patents of Patent Applications Treated as Related (Appendix P), Oct. 9, 2015, pp. 1-2.
Baudel et al., "Sharing and Executing Sensitive Logic Semantics," Pending U.S. Appl. No. 14/618,394, filed Feb. 10, 2015, pp. 1-34.
Wikipedia, "Static program analysis," https://en.wikipedia.org/wiki/Static_program_analysis, Printed on Oct. 9, 2015, pp. 1-4.
Wikipedia, "Obfuscation (software)," https://en.wikipedia.org/wiki/Obfuscation_%28software%29, Printed on Oct. 9, 2015, pp. 1-5.
DB2-LUW-Academy, IBM DB2 LUW through Video Tutorials, "DB2 Tips n Tricks Part 11—Concealing Business Logic in Database—Obfuscation of DDLs," YouTube, Published on Oct. 2, 2013. Accessed on Jan. 29, 2015,https://www.youtube.com/watch?v=vg0ebzL_-al.
Sivadasan et al., "Securing SQLJ Source Codes from Business Logic Disclosure by Data Hiding Obfuscation," Cornell University Library, arXiv.org, Submitted on May 22, 2012.
"Rule Based Programming," Program-Transformation.Org: The Program Transformation Wiki, Accessed on Jan. 29, 2015, http://www.program-transformation.org/Transform/RuleBasedProgramming.

\* cited by examiner

SHARING AND EXECUTING SENSITIVE LOGIC SEMANTICS

BACKGROUND

This invention relates to a method and apparatus for sharing and executing sensitive logic semantics.

The invention operates in the general environment of software support and maintenance. In this context, it is frequent that a software defect has been spotted and can be reproduced. However, the particular data instance and program logic involved cannot be communicated to the person responsible for analyzing the issue and solving it for confidentiality reasons.

In computer system tools for managing processes and decisions, some sensitive parts of decision and process logic (referred to henceforth as sensitive decision logic and sensitive process logic) are written by high level users and should not be made available to administrators, technical support, or developers. For instance, technical support personnel in charge of maintaining the whole program may be from a different company and/or not have the proper clearance for the sensitive decision logic and/or sensitive process logic.

A significant evolution of the past 10 years in software systems is the distribution of enterprise applications and the separation of concerns between software infrastructure and the decision and process logic that structure it. Exemplified by process and decision management tools, enterprise applications are deployed in cloud environments or a variety of software systems, and embed or access decision services, which contain some specific subprograms that describe the sensitive decision and process logic. The sensitive logic may often be critical to the operation of the organization. It is condensed in relatively isolated and easily identifiable segments, which is convenient for maintenance and evolution, but represents a serious vulnerability, should it be made accessible beyond a contained perimeter.

SUMMARY

The embodiments pertain to the situation where the decision logic is described as a rule based program. A rule based program, in its simplest form, is a collection of independent rules. A rule is composed of two program statements: a guard that describes a set of conditions involving the state of the working memory, and an execution statement which describes a set of state changes over the working memory.

In a first aspect of the invention there is provided a system for removing high level logic from a source program, said system comprising: a structure characterizing engine for characterizing two or more fields in the source program by their respective value characteristics; a mapping engine for mapping, with respect to the source program, a first field to second field having similar value characteristics as the first field; and a rule set transformation engine for creating a target program by replacing, in the source program, the first field with the second field and replacing each first field value with a corresponding second field value thereby preserving the value characteristics of the source program.

Preserving the value characteristics provides for leaving underlying operational logic structure intact when denotational logic structure is removed from the source program.

The value characteristics are the value type and the value structure in the preferred embodiment.

In a second aspect of the invention there is provided a method for removing high level logic structure from a source program, said method comprising: characterizing two or more source program fields by their respective value characteristics; mapping, with respect to the source program, a first field to a second field having similar value characteristics as the first field; and creating a target program by replacing, in the source program, the first field with the second field and replacing each first field value with a corresponding second field value thereby preserving the value characteristics of the source program.

The embodiments apply equally well to other contexts, such as applications that implement part of their logic as structured query language (SQL) statements, or contain embedded scripting features, in which denotational logic exists in the scripts that configure the application.

The embodiments aim not at preserving the original meaning of the denotational logic, but to the contrary, to make it unintelligible, while preserving the technical behavior of underlying decision and process operational logic. This way, it becomes possible to assess the malfunction or performance issue, without being able to reconstruct the actual meaning of the denotational logic.

Systems that include high level sensitive information would benefit from removing denotational logic and replacing it with some usable, sensible, but fake logic, that lets the system run as expected on the surface, yet does not reveal the high level sensitive information. One typical need is quality assurance and performance testing that need to setup test systems to verify and benchmark the systems, yet have no need for the actual sensitive logic. For instance, in the context of maintenance of decision management tools, there have been frequent occasions wherein a customer could reproduce a problem, but would not authorize the technical person in charge to access the needed information to reproduce it. Sometimes, a technical support would have to travel to the customer site, other times the technical support would spend considerable amount of time trying to reproduce the problem without access to a test case, through partial information given by the customer.

To this achieve this effect, the embodiments provide transformation logic for transforming decision logic presented as a program, such that such logic keeps some useful properties: it is still executable, outputs results share similar properties with the original program, but examination of this (fake) logic shall not provide actual information on the details and critical aspects of the real logic.

The base principle involves creating a random permutation of the object model's attributes and classes, mapping each attribute to another one or a combination of other attributes, and then creating a mapping between the domains of the source and target attributes, that preserves the boundary conditions of the business logic.

The obfuscation technique of the embodiments does not preserve the sensitive logic (also known as denotational semantics or meaning) of the whole program, but only its operational logic and global structure so that the program remains executable and produces the same logic flow as the original program.

The embodiments are described in terms of a rule base programming paradigm but are not limited to this programming concept. Indeed, this programming paradigm is Turing complete, meaning any program may be transformed into a similar program expressed in this formalism, and therefore the embodiments are not limited to rule based programs. Actual programs involve more complex concepts that can be reduced to concepts of: working memory, guards, and guarded statements and there is no loss of generality in considering a rule program in this very simple form.

Working memory is a data structure made of objects and classes that are examined and manipulated by the program. A guard is made of a set of variable declarations, which are bound to objects of the working memory, and a conjunction of conditions. Each condition (in the canonical form of rules) is made of an attribute to be tested (for instance, "the applicant's age"), an operator (equals, is less than, is more than . . . ) and an operand that can be a constant, another attribute or an expression involving both constants and attributes. A guarded statement is a statement, in its simplest form, is a side effect of the program (print, display . . . ) or the assignment of the result of an expression to an object of the working memory. For example:

{Guard} IF the applicant has been in the same company for less than 2 years AND the applicant is over 22 years old {Guarded statement} THEN add a loss of employment insurance to the loan application Background information on the field of rule based programming can be found at http://www.program-transformation.org/Transform/RuleBasedProgramming. Since a rule-based program is a Turing complete programming paradigm, then any other type of program can be converted into an equivalent rule-based program with same functionality. Other embodiments are envisaged for other programming paradigms.

Preferably further comprising minimizing source program field domain cardinality and whereby a first field and second field mapped pair are chosen based on substantially similar field domain cardinality. Said minimization is determined using static analysis of the rule set. The embodiments uses carefully selected specific static analysis techniques that identify data structure accesses, variable domains, side effects, conditions, tests and constants, so that they can be obfuscated or modified according to some structure-preserving transformations. The cardinality of each target field should be equal to or more than the cardinality of source domain.

More preferably scanning the rules for an operation error between when the first field is replaced by the second field and mapping the first field to a different field if an error is found. Scanning for an operation error preserves the algebraic operators used in the program (+,−,/,*,<, =,>=).

Yet more preferably further comprising simulating a function of first field values so that that output value characteristics are similar to that provided by the function and second field values. Such simulation of a source program function is usually for black box functions although any function can be simulated. The simulation process comprises memoization. Test calls are performed on the source function to collect the structure of the output.

Even more preferably whereby if a mapping cannot be performed then the mapping is noted and further input requested.

Still more preferably further comprising integrated development environment with an application programming interface that can inspect the modified target program without access to the underlying source program.

Advantageously further comprising applying traditional obfuscation to the source program.

More advantageously further comprising transforming said source program into an input rule set based program including a data object model.

Still more advantageously wherein for a first field value characteristic having order then the order is reversed for the second field value characteristic structure. Such reversal of order of a value characteristic (the value structure) is for additional obfuscation.

The embodiments ensure that that transformation of the source program has no effect on the underlying operation of when the transformed source program is executed.

In a third aspect of the invention there is provided a computer program product for removing high level logic structure from a source program, the computer program product comprising a computer-readable storage medium having computer-readable program code embodied therewith and the computer-readable program code configured to perform all the steps of the method claims.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE SEVERAL VIEWS OF THE DRAWINGS

Preferred embodiments of the present invention will now be described, by way of example only, with reference to the following drawings.

DETAILED DESCRIPTION

Figure 1A:
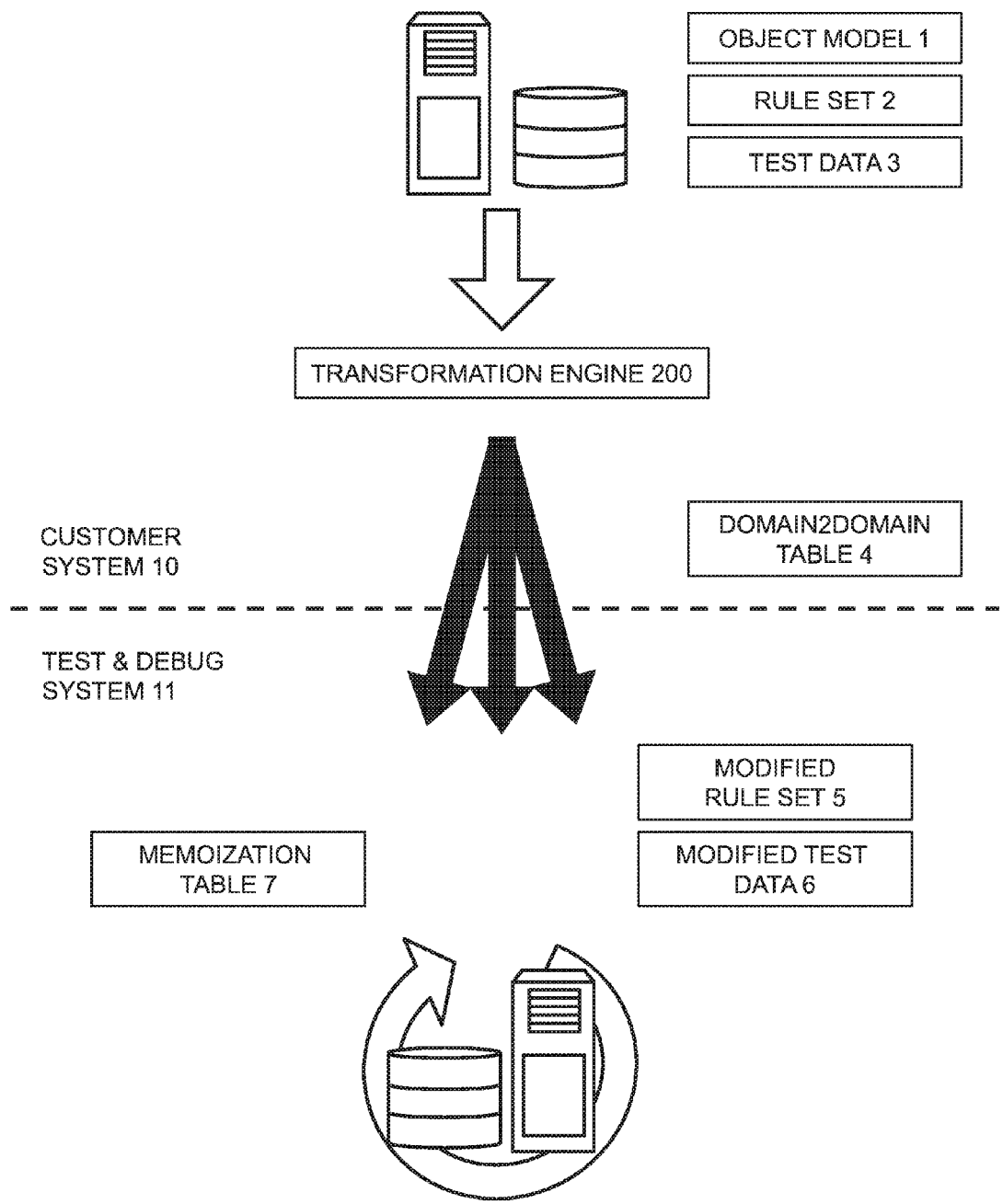
FIG. 1A is a high level deployment diagram of the preferred embodiment.

Referring to FIG. 1A, a high level deployment diagram of the preferred embodiment comprises: a customer system 10 and a test and debug system 11.

The customer system 10 is a computer system and storage system comprising: object model 1; rule set 2; test data 3; and transformation engine 200. In operation an intermediate domain2domain table 4 is created before creating final output data for the test and debug system 11. The test and debug system receives the final output data from the customer system 10 of: modified rule set 5; modified test data 6; and memoization table 7.

Object model 1 is the model of the program data fields used in the rule set 2.

Rule set 2 is a program, a source program comprising a set of rules to be transformed into a modified rule set also known as the target program.

Test data 3 is data that is used to check that the transformation is valid.

Transformation engine 200 is for performing a transformation on rule set 2 and test data 3 to provide modified rule set 5, modified test data 6 and memoization table 7.

Intermediate domain2domain table 4 is for storing a mapping from each of the source fields to a respective target field.

Modified rule set 5 is for storing the modified rule set.

Modified test data 6 is for storing modified test data.

Memoization table 7 is for storing the parameters that are used to simulate functions acting on target values so that the results returned from a simulated function of target values corresponds to results returned from the function and source values.

Figure 1B:
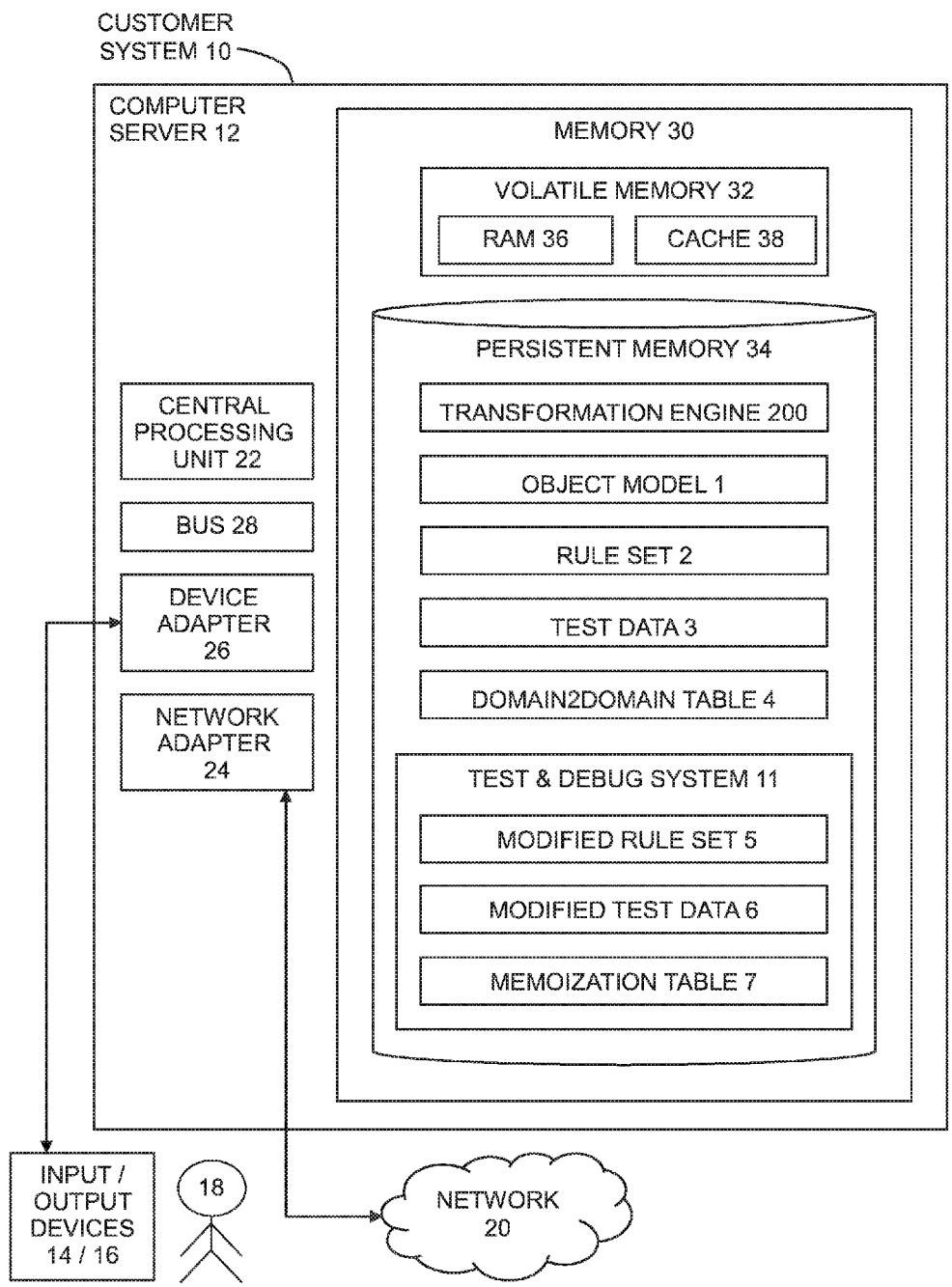
FIG. 1B is computer processing system deployment diagram of the preferred embodiment.

Referring to FIG. 1B, the deployment of a customer system 10 is described. Customer system 10 is operational with numerous other general purpose or special purpose computing system environments or configurations. Examples of well-known computing processing systems, environments, and/or configurations that may be suitable for use with customer system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment for example where a computer processing systems are distributed in a network of objects that can interact with a computing service.

Customer system 10 may be described in the general context of computer system-executable instructions, such as program modules, being executed by a computer processor. Generally, program modules may include routines, programs, objects, components, logic, and data structures that perform particular tasks or implement particular abstract data types. Customer system 10 may be embodied in distributed cloud computing environments where tasks are performed by remote processing devices that are linked through a communications network. In a distributed cloud computing environment, program modules may be located in both local and remote computer system storage media including memory storage devices.

Customer system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: transformation engine 200; object model 1; rule set 2; test data 3; domain2domain table 4. Test and debug system 11 is created as an intermediate image on the customer system 10 before being sent to a remote test and debug system. Test and debug system 11 comprises modified rule set 5; modified test data 6; and memoization table 7. Further program modules that support the preferred embodiment but are not shown include firmware, boot strap program, operating system, and support applications. Each of the operating system, support applications, other program modules, and program data or some combination thereof, may include an implementation of a networking environment.

Figure 2:
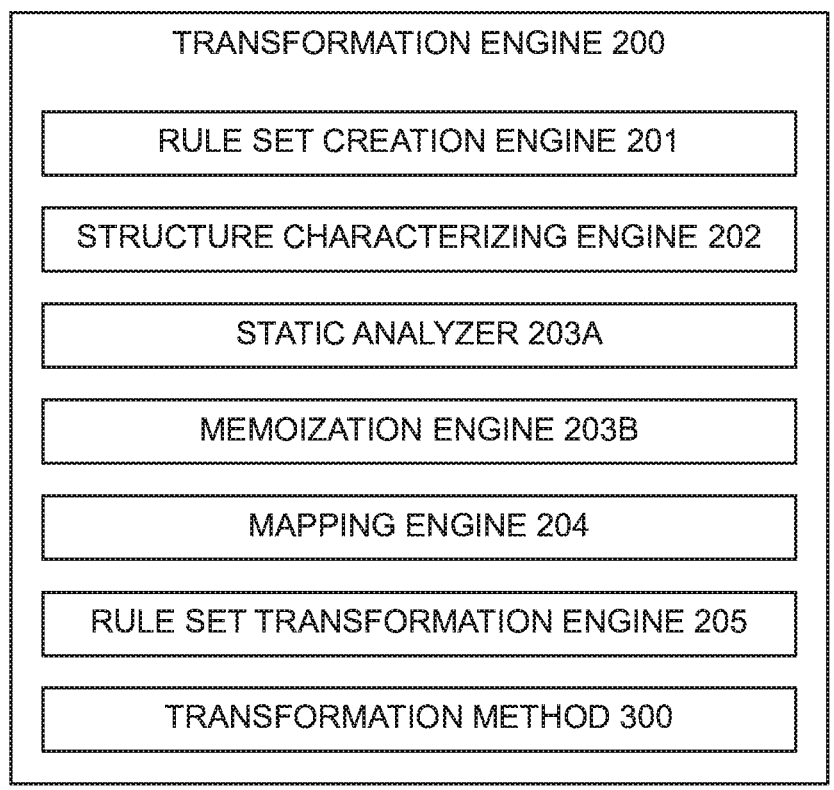
FIG. 2 is a component diagram of the preferred embodiment.

Referring to FIG. 2, transformation engine 200 comprises the following components: rule set creation engine 201; structure characterizing engine 202; static analyzer 203A; memoization engine 203B; mapping engine 204; rule set transformation engine 205; transformation method 300.

Rule set creation engine 201 is for transforming said source program into an input rule based program including an object model.

Structure characterizing engine 202 is for characterizing two or more object model fields by respective value type and value structures.

Static analyzer 203A is for characterizing value structures by static analysis of the data fields and values.

Memoization engine 203B is for simulating a function of target fields and modified test data so that the results corresponds to the function of source field and test data.

Mapping engine 204 is for mapping one data field to another data field.

Rule set transformation engine 205 is for mapping, with respect to the object model, at least one characterized field (a source field) to another characterized field (a target field) that has the same value type and preferably substantially similar value structures.

Transformation method 300 is for performing the method of the preferred embodiment using the components of transformation engine 200. The input of transformation method 300 is object model 1, rule set 2 and test data 3 as defined above. The output is domain2domain table 4; modified rule set 5; modified test data 6 and memoization table 7.

Rule set fields are typed, and, for convenience, the domain of each field may be provided to help preserve sensible semantics of the output. For example, if salary is replaced by age in the output rule set, then the range 0 . . . 10000 is mapped to the range 18 . . . 80. If the domain is not provided in the object model then the domains will be deduced from examination of the test data.

Transformation method 300 outputs a rule set matching the same input data model, executable in the same context, but leaving no usable information in the denotational logic (the meaning logic layer) involved in program, while preserving the operational logic (execution flow).

Figure 3:
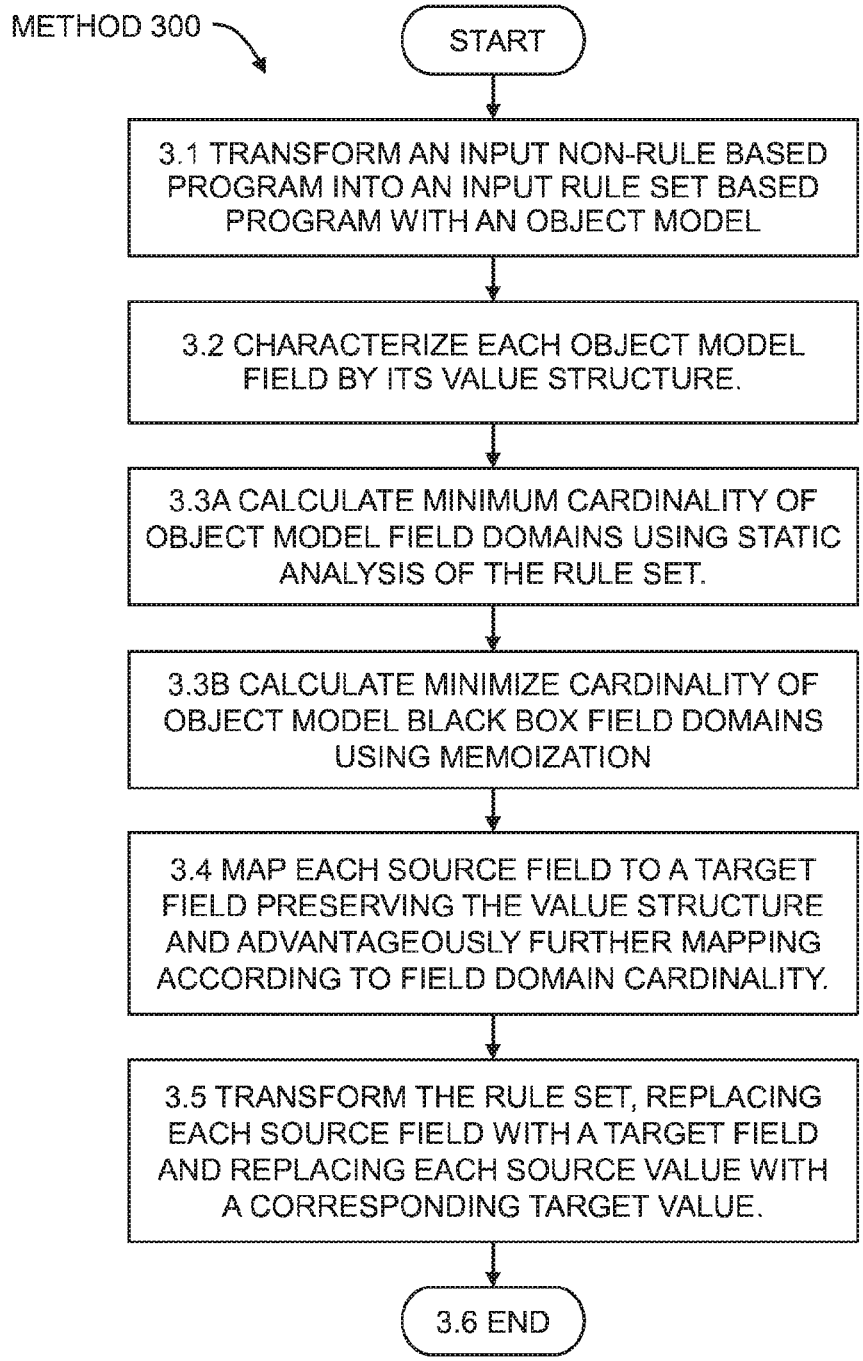
FIG. 3 is a flow diagram of a process of the preferred embodiment.

Referring to FIG. 3, method 300 comprises logical process steps 3.1, 3.2, 3.3A. 3.3B, 3.4, 3.5 and 3.6.

Step 3.1 is for preprocessing an input non-rule based program into an input rule-based program. Hence if the input program is rule-based already then this step is not required. This step is performed using known transformations. For instance, turning an imperative program into a rule based program may be performed by creating a rule for each line of the input program, with a guard that tests a "current line number" variable, and effects which include incrementing the current line number and performing the expression described at the current line. Once the input program is described in the form: rules made of guards and guard statements; then the method can continue. This step is only performed if input program is non-rule based.

Step 3.2 is for characterizing attribute domains by structure of the respective values. This step is necessary for a domain translation step for mapping values of a domain (say, string, integer, double . . . ) onto values of another domain in a consistent way according to the structure of respective values. The characterization step identifies the structure of the values of each domain, which can be one of (by increased order of complexity): nominal values; ordered values; interval values; and ratio values.

Nominal values have a characteristic whereby a domain has no particular value structure to respect (for instance, string or text types like "hello world"). Ordered values have a characteristic whereby a domain has an ordered or monoidal value (for instance, enumerations like 1, 2, 3 . . . n). Interval values have a characteristic whereby a domain has a semi-group structure, making the difference between values significant (for instance, a time or date dimension). Ratio values have a characteristic whereby a domain has a ring structure, allowing ratios to be taken (for instance a revenue, or population attributes).

This characterization of variable domains is fairly well known in the area of descriptive statistics. Of note: on computer types, because all domains are ultimately made of sequences of bits, it is always possible to raise or lower a domain characteristic by considering the raw bits that constitute a value in this domain as an integer, which is a type that has a ratio characteristic.

The later mapping step comprises will choose a mapping between the input and output domain ranges. This mapping must preserve the value structure of the input range, but if no proper substitute is available, another available attribute is chosen, and an artificial value structure of the proper type is created for the purpose of mapping. Next, a mapping is created that projects values from the input domain to the target domain. This mapping shall respect the value structure of the domains, but the order value structures may be reversed for additional obfuscation. For instance age can be mapped to revenue, only high revenues are mapped to low age, and vice-versa.

Step 3.3A is for calculating a minimum domain cardinality for each domain attribute using static analysis of the ruleset and the object model. Since the mapping should involve field domains of similar cardinality, the domain's cardinalities can be further reduced by inspecting the ruleset for boundary conditions on all the attributes, and thereby reduce the domain to only a single value for the each interval considered. However, if a source domain is too large to fit the target domain, then the source attribute is analyzed to determine a relevant subdomain made of ranges that will allow creating the mappings properly. Step 3.3A comprises steps 3.3A1, 3.3A2, 3.3A3 and 3.3A4.

Step 3.3A1 is for examining the object model and setting a first cardinality for each field.

Step 3.3A2 is for visiting the rule fields in the rule set

Step 3.3A3 is for collecting all the classes, fields, operators and values used within the rules.

Step 3.3A4 is for reducing the effective cardinality for each field. In this step numeric values are used for numeric domains. For example. Revenue [10000 . . . 100000] $\Leftrightarrow$Name[Alfred . . . Zigomar]→map the string's bytes to an integer range, possibly semi-intelligent to preserve readability.

Step 3.3B is for memoization of functions that cannot be statically analyzed, like black box functions although any other functions may undergo memoization. Memoization simulates a function by creating algebraic structures when a function cannot be analyzed. For example, if date of birth (source) is mapped to revenue(target), the function monthOf (date) must be turned into a function monthOf(revenue) and its values in the test data set must be consistent with values of revenue. Step 3.3B comprises steps 3.3B1 and 3.3B2.

Step 3.3B1 is for instrumentation of the functions using aspect oriented programming to enable collecting the arguments and the return values. In the input program, the black box functions (such as monthOf(date) are augmented to collect the output they provide to given input values.

Step 3.3B2 is for execution of the modified rule set 5 to create memoization table 7 and define the set of input values. Argument values and the return values are collected in memoization table 7 for the invoked methods. Memoization table 7 is saved for further use. Continuing the former example, all the pairs (date of birth→month) are collected to build a corresponding table revenue→month that will be used in the output program instead of the original monthOf (date).

Step 3.4 is for mapping object model fields according to their characterizations. Step 3.4 is performed for each field in each sensitive class of the object model and fields that are not in sensitive classes do not need to be mapped. Some fields in sensitive classes are not mapped. Step 3.4 is for creating a random permutation of the fields, mapping each field to another of similar value structure. In the preferred embodiment, mapping further comprises mapping each field to another field of equal or superior cardinality. In another embodiment it is possible to map to a combination of lower cardinality attributes but that is not disclosed here. An input field is mapped onto a target field and stored in domain2domain table 4.

Step 3.5 is for transforming the rule set and replacing the occurrences of source field with the target field according to domain2domain table 4. Step 3.5 comprises steps 3.5.1, 3.5.2 and 3.5.3.

Step 3.5.1 is for transforming the inputs accordingly.

Step 3.5.2 is for checking that the operators used in the rule set preserve the mapping (the direction respects the value mapping).

Step 3.5.3 is for reporting to a user if an attribute cannot be mapped (too high cardinality) whereby the user is asked what to do.

Figure 4:
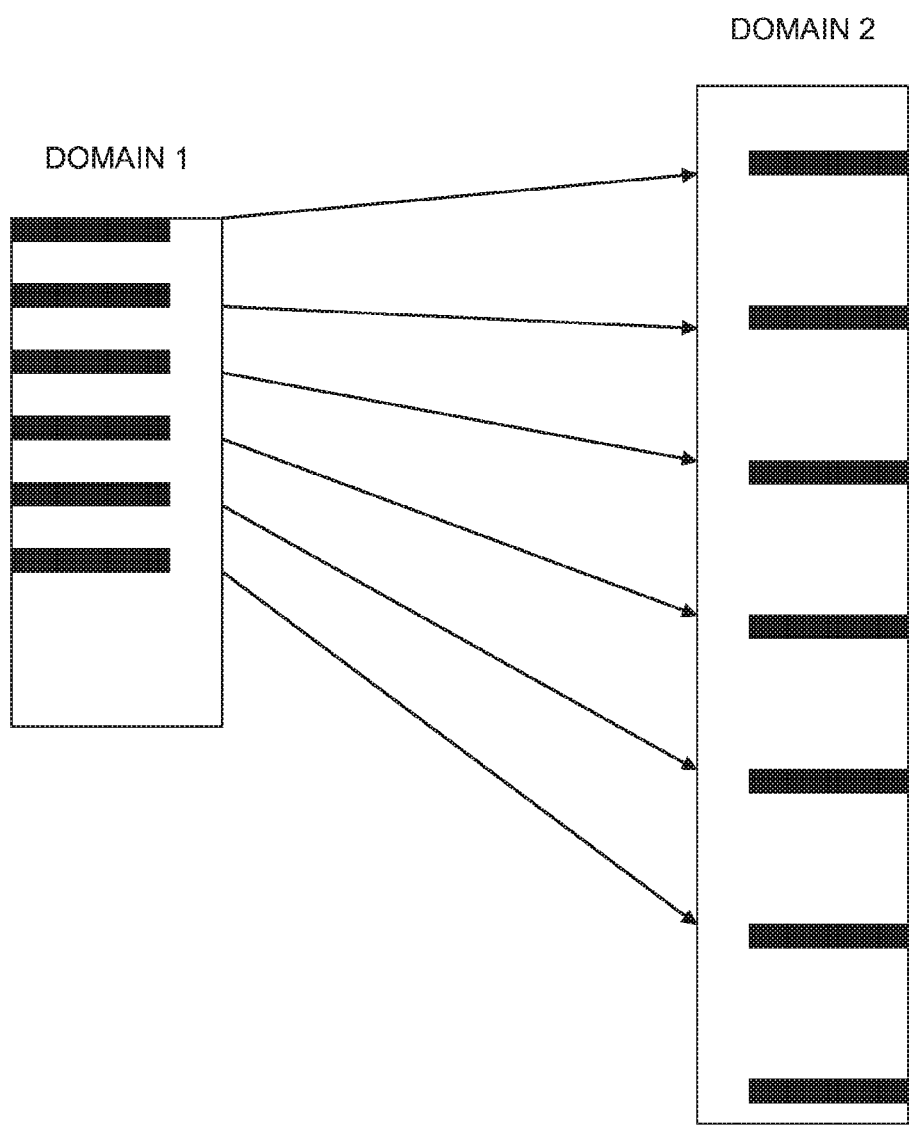
FIG. 4 is an example of the domain mapping of preferred embodiment.

Referring to FIG. 4 is an example of the domain mapping of preferred embodiment comprises two different size domains: domain 1 and domain 2. Intervals as (indicated by the black bars) within the domain range (as indicated by a box) in domain 1 are spaced differently from domain 2. Arrows between the domains show how intervals in one domain are mapped into the other domain. Operators preserve the directions.

An example of a rule based program as process by the preferred embodiment is now described.

In the present example a rule in a rule set 2 comprises:

IF the applicant is over 22 years old THEN raise the premium by 5%→A premium becomes 126, B premium stays at 120

In the present example test data 3 comprises:

Applicant (name: A, age: 18, loan: 20000, premium: 120, revenue: 50000)

Applicant (name: B, age: 23, loan: 20000, premium: 120, revenue: 50000)

After transformation the following field transforms are selected and stored in domain2domain table 4:

Age [18 . . . 120]<->Revenue [100000 . . . 10000], preserves '<'

Premium [100 . . . 500]<->Loan [10000 . . . 200000], preserves '<,+,-,*,/'

This transforms into the following modified rule set 5:

IF the applicant has less than 13529 revenue THEN raise the loan by 20%→A loan becomes 14940, B loan stays at 20000

This also transforms into the following modified test data 6:

Applicant (name: A, age: 25, loan: 20000, premium: 120, revenue: 18000)

Applicant (name: B, age: 25, loan: 20000, premium: 120, revenue: 23000)

This new program and dataset preserve the execution properties of the rule set on its inputs, but destroys the business logic (it makes no sense to raise the requested loan in the present context of loan insurance premium computation), in way that is unrecoverable for someone who does not know the chosen permutation.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for obfuscating denotational logic in a source program, the method comprising:
receiving, by a computer, a non-rule-based source program;
transforming, by the computer, the non-rule-based source program into a rule-based source program that includes an object model and a ruleset;
characterizing, by the computer, attribute domains of the rule-based source program by a structure of their respective values, wherein the structure of the values is one of: nominal, ordered, interval, and ratio;
calculating, by the computer, a minimum cardinality for each domain attribute using static analysis of the ruleset and the object model;
mapping, by the computer, one or more first domain ranges to one or more second domain ranges, respectively, wherein each second domain range has the same value structure and same or higher cardinality as the corresponding first domain range; and
for the ruleset in the rule-based source program in which an input field is in one of the one or more first domains, replacing, in the ruleset, the input field with the respective input field from the respective second domain, and replacing each input field value with the corresponding mapped second field value.

2. A method according to claim 1 further comprising simulating a function of a second field value so that output value characteristics correspond to that provided by the function and corresponding first field values.

3. A method according to claim 1 whereby if a mapping cannot be performed then the mapping is noted and further input is requested.

4. A method according to claim 1 further comprising an integrated development environment with an application programming interface that can inspect the rule-based source program without access to the non-rule-based source program.

5. A method according to claim 1 wherein for a first field value characteristic having order then the order is reversed for the second field value characteristic.

* * * * *